United States Patent [19]

Northern

[11] 4,271,928
[45] Jun. 9, 1981

[54] LUBRICANT SUPPLY DEVICE

[75] Inventor: James Northern, Hemel Hempstead, England

[73] Assignee: Rolls-Royce Limited, London, England

[21] Appl. No.: 38,228

[22] Filed: May 11, 1979

[30] Foreign Application Priority Data

Jul. 11, 1978 [GB] United Kingdom ............... 29440/78

[51] Int. Cl.³ ...................... F01M 11/12; F16D 3/46
[52] U.S. Cl. .................................... 184/6.4; 184/6.11; 184/6.12; 60/39.08
[58] Field of Search ...................... 184/6.12, 6.11, 6.4, 184/6.2, 6, 11 R, 13 R; 60/39.08; 74/467

[56] References Cited

U.S. PATENT DOCUMENTS

| 2,316,729 | 4/1943 | Tryon | 184/6.2 X |
| 3,266,596 | 8/1966 | Blackhurst et al. | 184/6.11 X |
| 3,597,024 | 8/1971 | Singelmann | 184/6.4 X |
| 3,650,353 | 3/1972 | Abbott | 184/6.12 |
| 4,144,950 | 3/1979 | Moyer et al. | 184/6.11 |
| 4,153,141 | 5/1979 | Methlie | 184/6.2 |

Primary Examiner—David H. Brown
Attorney, Agent, or Firm—Cushman, Darby & Cushman

[57] ABSTRACT

A lubricant supply device adapted to direct lubricant from a source of pressurized lubricant to apparatus to be lubricated. The device is provided with a rotatable chamber containing a limited quantity of lubricant so that in the event of a failure in the supply of lubricant to the device, lubricant contained within the chamber is centrifugally pumped to the apparatus to be lubricated in order to maintain a limited continuity of lubricant supply.

4 Claims, 3 Drawing Figures

LUBRICANT SUPPLY DEVICE

The invention relates to a lubricant supply device.

Lubricant supply systems incorporated into powerplants mounted on aircraft can be subjected to an inertial force produced during an in-flight manoeuvre of the aircraft which interrupts temporarily the supply of lubricant to a component such as a bearing and causes seizure of the component by overheating due to lack of lubrication. Lubricant supply systems comprise a sump from which oil is supplied by means of a pump to components to be lubricated and the temporary interruption of the oil supply is due to the oil in the sump being displaced away from the inlet of the pump during the time that the inertial force is acting.

Previously, a solution to the problem of temporary interruption in the supply of oil to a component has been to provide a baffle plate system within the sump to delay or prevent displacement of the oil away from the inlet to the pump during the time period of the inertial force. This solution has proved costly in design and manufacture as well as incurring an increased weight and cost penalty in aircraft operation. Another solution has been to provide a reserve reservoir of oil to supply oil to lubricate the component during the time period of the interruption of oil supply from the sump. The reserve reservoir supplies oil by gas pressure means and is controlled by a check valve which is actuated by a means which senses interruption of the oil supply from the sump. This solution incurs an increased cost and weight penalty in aircraft operation as well as problems of design and reliability of the check valve and the sensing means.

It is an object of the present invention to provide an improved lubricant supply device.

According to the present invention, a lubricant supply device is adapted in operation to be supplied with lubricant from a source of pressurised lubricant and to direct said lubricant to the apparatus to be lubricated, a minor proportion of said lubricant supplied to said device being directed to said apparatus to be lubricated via a chamber provided within said lubricant supply device and outlet means associated with said chamber, said lubricant supply device being adapted to be rotated about an axis of rotation and said chamber and said chamber outlet means being so disposed with respect to said axis of rotation that in the event of a reduction in the pressurised lubricant supply causing a cessation in the supply of lubricant to said lubricant supply device, lubricant contained within said chamber is centrifugally pumped through said chamber outlet means to provide a continued supply of lubricant to said apparatus to be lubricated.

Said lubricant supply device is preferably provided with an inlet passage disposed coaxially with said axis of rotation and adapted to receive said lubricant supplied to said device.

Said lubricant supply device may be provided with a manifold which manifold is adapted to be supplied with lubricant from both said chamber via said chamber outlet means and directly from said inlet passage, said manifold being adapted in turn to direct said lubricant to said apparatus to be lubricated.

Said chamber outlet means may comprise a metering orifice so dimensioned as to ensure that the proportion of said lubricant supplied to said manifold via said metering orifice is a minor proportion of the total amount of lubricant supplied to said manifold.

The advantages over the prior art of a lubricant supply device according to the present invention are that the device does not require means to sense a reduction in supply of lubricant nor a separate pressurised reservoir of lubricant to supply lubricant in the event of reduction of normal supply of lubricant. Furthermore the device is comparatively light in weight and inexpensive to manufacture.

The invention will now be described, by way of example, with reference to the accompanying drawings, in which.

Figure 1:
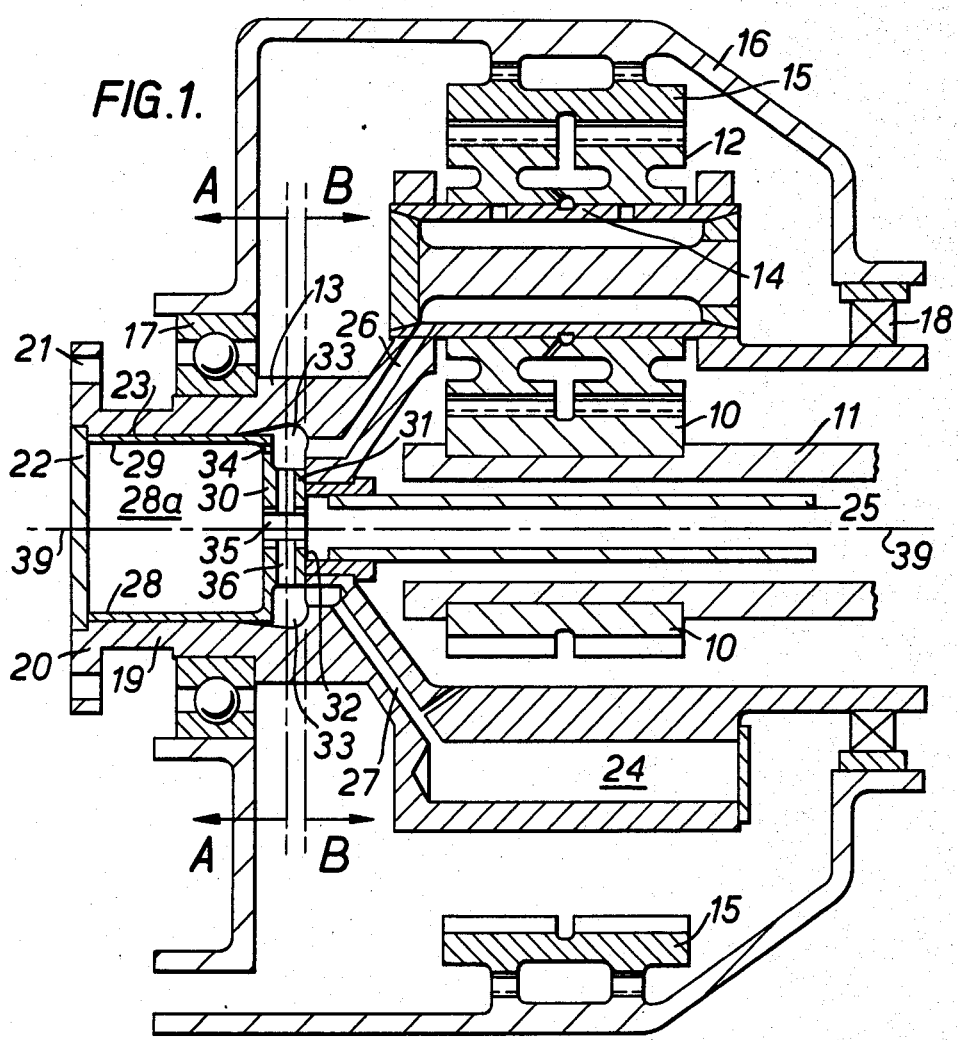
FIG. 1 is a cross-sectional view of an epicyclic gearbox embodying a lubricant supply device according to this invention.

In FIG. 1 a sun gear 10 is fixedly mounted from a driving shaft 11 and meshes with three equi-angularly spaced planet gears 12 which are mounted for rotation on a rotatable planet carrier 13 by means of plain bearings 14. The planet gears 12 mesh with an annulus gear 15 which is fixedly mounted from gear casing 16 which is rigidly mounted from support means (not shown).

The planet gear carrier 13 is mounted for rotation in bearings 17 and 18 and comprises a forwardly projecting annular portion 19 having a flange 20. The flange 20 has bolt-holes 21 through which bolted connection can be made to apparatus (not shown) to be driven. A sealing disc 22 is fixed to the end of the forwardly projecting annular portion 19 to form an enclosed compartment 23.

The planet gear carrier 13 also carries three oil jet devices 24 which are equi-angularly and alternately spaced between the planet gears 12.

Co-axially mounted and rotatable with and in flow communication with the compartment 23 in the carrier 13 is a tube 25. The tube is in flow connection from the right-hand side of the drawing with a pump and a lubricating oil sump not shown.

Figure 3:
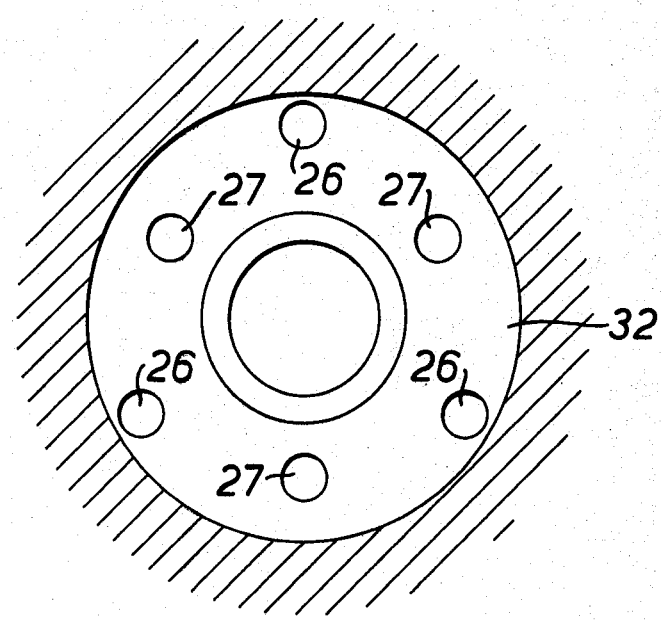
FIG. 3 is an enlarged section taken on line B—B of FIG. 1 showing part of the gearbox.

The compartment 23 is in flow connection with each of the plain bearings 14 by means of three passages 26 in the carrier 13, and, is in flow connection with each of the oil jet devices 24 by means of three passages 27. The radial distance from the axis of rotation 39 of the gearbox of the entrances to each of the passages 26 is greater than the radial distance of the entrances to each of the passages 27 as can be seen more clearly from FIG. 3.

A lubricant supply device 28 which is in accordance with the present invention is mounted in the compartment 23. If device 28 was not present then lubricating oil would be pumped from the aforementioned pump along the tube 25 into the compartment 23 and from the compartment 23 through passages 26 and 27 to the plain bearings 14 and the oil-jet devices 24. The oil-jet devices 24 spray the oil to generally lubricate the gearbox. The lubricating oil is returned to the aforementioned sump from the gearbox by means not shown. If the oil supply is interrupted during operation of the gearbox then the plain bearings 14 will soon overheat and seizure will result. When the gearbox is part of an aircraft propulsion plant the seizure could be catastrophic in result and it is in such applications where temporary interruption of oil supply can result from manoeuvres of the aircraft in flight. Such temporary interruption in lubricating oil supply being caused by the oil being displaced in the sump away from the inlet to the pump by inertial force, for example, negative "g" effect. If temporary interruption of oil supply occured during operation then the oil present in compartment 23 and some from tube 25 would quickly be emptied into passages 26 and 27 by centrifugal force, though passages 26 by reason of the greater radial distance of their entrances from the axis of rotation would be supplied with oil from the compartment 23 for longer than passages 27. Nevertheless oil starvation of plain bearings 14 would quickly result.

The purpose of device 28 is that whilst not impeding the flow of pressurised oil from the pump through the gearbox it would, in the event of temporary interruption of oil supply, meter out the oil present in compartment 23 and some oil from tube 25 in the form of an "iron ration" for sufficient period of time to keep the plain bearings 14 from seizure due to lack of lubrication. The time period for an interruption in oil supply due to a negative "g" effect is only a few seconds but without some lubrication during that time period a plain bearing could overheat.

Device 28 comprises a hollow cylindrical tube 29, an end wall 30 sealing one end of the tube 29, and a projection 31 extending from the end wall 30 to abut face 32 of chamber 23 and space the end wall 30 from it to form an annular manifold 33.

In this particular case the annular manifold 33 is defined by both the device 28 and the planet gear carrier 13 but it is to be understood that the annular manifold 33 constitutes a portion of the lubricant supply device 28 in accordance with the present invention. This being so, it will be appreciated that the annular manifold 33 could, in alternative embodiments of the present invention, be defined solely within the device 28. The sealing disc 22 cooperates with the device 28 to define a chamber 28a enclosed within the device 28.

The hollow cylindrical tube 29 forms a close fit with the inner periphery of annular portion 19.

Figure 2:
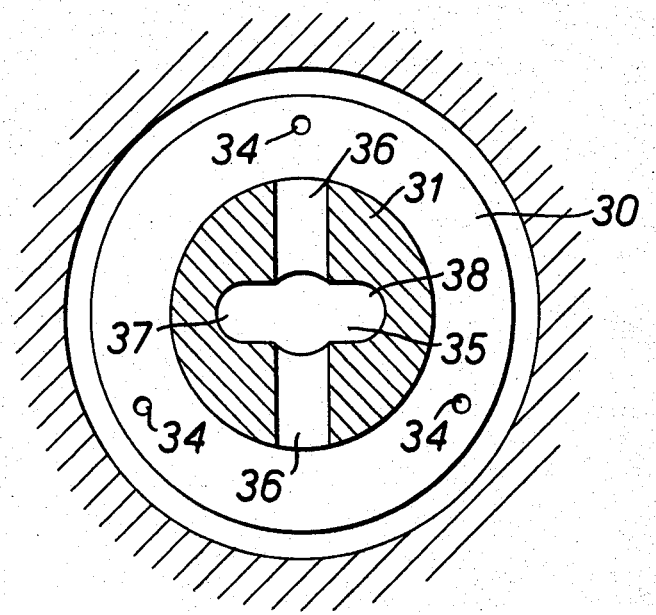
FIG. 2 is an enlarged section taken on line A—A of FIG. 1 of the lubricant supply device.

The end wall 30 has three outlets 34 at its outer radial portion (see FIG. 2). The outlets 34 are equi-angularly spaced and aligned with passages 26. The outlets 34 are sized so that they constitute metering orifices to allow a predetermined amount of oil to pass through them from chamber 28a at a given rotational speed of the device 28.

The end wall 30 and the projection 31 have a passage 35 therethrough. The passage 35 is co-axial with the axis of rotation of the device 28 and provides an inlet passage interconnecting the tube 25 and the chamber 28a for the flow of lubricating oil.

Extending radially through projection 31 are two holes 36 of larger diameter than outlets 34 and connecting inlet passage 35 to the annular manifold 33.

From FIG. 2 it will be seen that inlet passage 35 is provided with two lobes 37 and 38, the lobes 37 and 38 being at greater radial distance from the axis of rotation 39 than the entrances to the holes 36 from the inlet passage 35. The most radially outward boundaries of lobes 37 and 38 are the same radial distance from the axis of rotation 39 as the outer surface of tube 25.

In normal operation, that is to say, rotating and receiving a pressurised supply of lubricating oil from the pump, oil flows through the inlet passage 25 into the chamber 28a before flowing into the annular manifold 33 through the chamber outlets 34 and thence into passages 26 and 27. The chamber 28a the inlet passage 35, the outlets 34, the holes 36, the annular manifold 33 and the passages 26 and 27 would all be full of pressurised oil.

In the event of interruption of pressurised oil supply from the pump whilst the gearbox is still being driven by driving shaft 11 then the only oil available for lubricating the gearbox is the oil present in the areas listed in the last sentence of the previous paragraph together with some oil expelled from tube 25 by centrifugal force acting on the oil present in the tube and causing it to flow out from the tube.

As the available oil continues to be centrifuged out of the abovementioned areas the main supply of oil through holes 36 would cease first and thereafter the only oil supplied to the plain bearings 14 would be through the outlets 34. The purpose of lobes 37 and 38 is now evident in that the small amount of oil flowing from tube 25 will flow into the hollow cylindrical tube 29 rather than through the main supply holes 36. The oil remaining in the chamber 28a would gradually be forced out through outlets 34 at a diminishing rate as the level of oil clinging to the wall of 29 fell. The outlets 34 are positioned adjacent the inner surface of chamber 28a to allow flow through them of as much of the remaining oil as possible.

Field trials with a gearbox fitted with the device 28 as hereinbefore described have proven that in the event of failure of oil supply the gearbox has performed satisfactorily for a significantly longer period of time under the "iron ration" condition imposed by device than would otherwise be the case and prevented seizure of the plain bearings during what would have been a catastrophic temporary interruption in the supply of lubricating oil during an aircraft manoeuvre.

The device 28 described in this example is symmetrical in shape and configuration about its axis of rotation. In other applications a device embodying the principle of the invention may not be symmetrical in shape and may rotate around an axis of rotation lying outside of the device.

I claim:
1. A lubricant supply device for receiving a lubricant under pressure from a lubricant supply means and delivering lubricant to an apparatus to be lubricated, said lubricant supply device comprising:
   inlet means for receiving lubricant under pressure from the lubricant supply means;
   a chamber rotatable about an axis of rotation, said chamber being operatively connected to and having communication with said inlet means for receiving lubricant under pressure therefrom;
   manifold means operatively rotatable with said chamber and disposed radially outwardly of said inlet means;
   passage means extending between said inlet means and said manifold means for delivering lubricant under pressure from said inlet means to said manifold means;
   an outlet means extending from said manifold means for delivering lubricant therefrom to the apparatus to be lubricated; and
   chamber outlet metering means between said chamber and said manifold means for delivering a minor proportion of a total amount of lubricant supplied to said manifold means when lubricant under pressure is being supplied by said inlet means to said chamber and to said passage means, said chamber outlet metering means being positioned in said chamber radially outwardly of said axis of rotation of said chamber and radially outwardly of said passage means whereby upon cessation of the supply of lubricant under pressure to said inlet means, any lubricant in said chamber is centrifugally pumped through said chamber outlet metering means to said manifold means and through said outlet means.

2. A lubricant supply device as claimed in claim 1 wherein said inlet means comprises a passage disposed coaxially with said axis of rotation of said chamber.

3. A lubricant supply device as claimed in claim 1 wherein said chamber outlet metering means includes a passage having a dimensional cross-sectional area less than a dimensional cross-sectional area of said passage means between said inlet means and said manifold means.

4. A lubricant supply device as claimed in claim 1 wherein said manifold means is annular in form and disposed coaxially with said axis of rotation of said chamber.

* * * * *